United States Patent [19]

Harigaya et al.

[11] Patent Number: 5,463,442
[45] Date of Patent: Oct. 31, 1995

[54] INTERCHANGEABLE LENS UNIT FOR USE IN CAMERA SYSTEM

[75] Inventors: Isao Harigaya, Kanagawa; Hirokazu Mogi, Saitama; Susumu Kozuki, Tokyo; Ryunosuke Iijima, Kanagawa; Masamichi Toyama, Kanagawa; Masahide Hirasawa, Kanagawa, all of Japan

[73] Assignee: Canon Kabushiki Kaisha, Tokyo, Japan

[21] Appl. No.: 963,005

[22] Filed: Oct. 19, 1992

Related U.S. Application Data

[63] Continuation of Ser. No. 556,957, Jul. 23, 1990, abandoned, which is a continuation of Ser. No. 399,176, Aug. 28, 1989, abandoned.

[30] Foreign Application Priority Data

Aug. 31, 1988 [JP] Japan .................. 63-216929
Feb. 9, 1989 [JP] Japan .................. 1-032391

[51] Int. Cl.⁶ .............................. G03B 3/00; G03B 13/18
[52] U.S. Cl. .................. 354/400; 354/195.1; 318/611; 318/630; 348/345
[58] Field of Search .................. 354/400, 401, 354/402, 403, 404, 405, 406, 407, 408, 409, 195.1, 195.12, 195.11; 358/225, 227; 318/611, 630

[56] References Cited

U.S. PATENT DOCUMENTS 4,908,647  3/1990  Ueyama ............................ 354/402
4,974,003  11/1990  Ohnuki et al. .................... 354/400

*Primary Examiner*—Kristine L. Kincaid
*Assistant Examiner*—Cassandra Spyrou
*Attorney, Agent, or Firm*—Robin, Blecker, Daley & Driscoll

[57] ABSTRACT

An interchangeable lens unit for use in a camera system which is arranged to drive a motor in the interchangeable lens on the basis of a signal supplied from a camera body. The interchangeable lens unit is provided with a circuit for continuously transmitting a specific signal to the camera body for at least the time period required to absorb a backlash when the direction of running of the motor is reversed with respect to the preceding direction of running of the same.

63 Claims, 9 Drawing Sheets

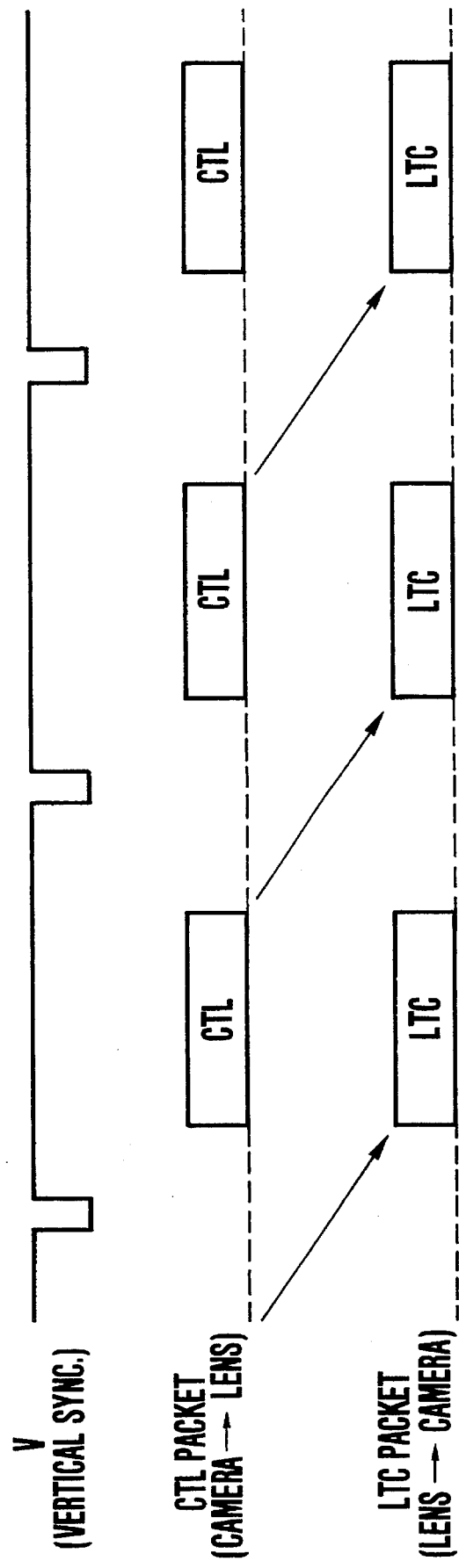

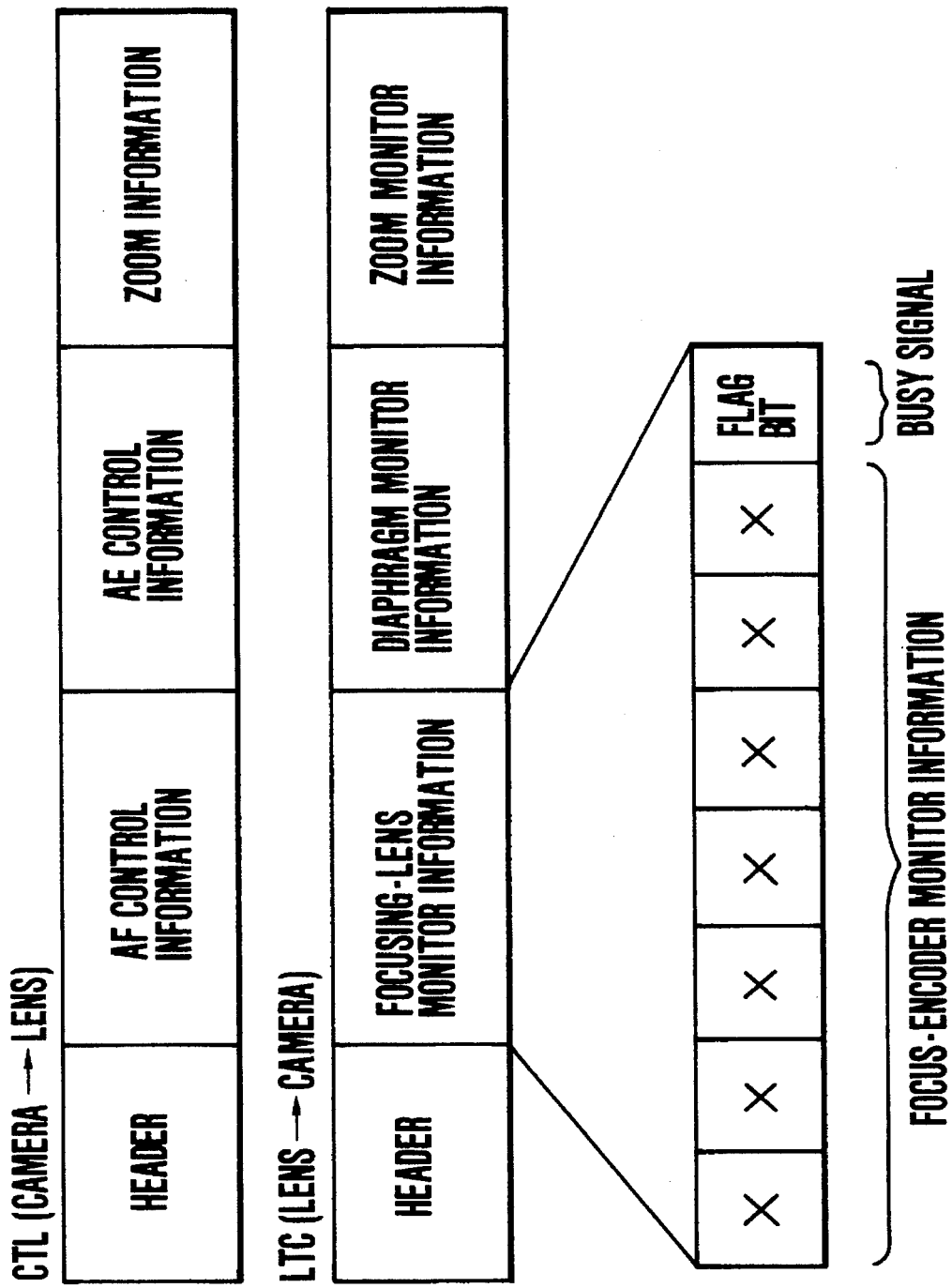

CAMERA-MICROCOMPUTER CONTROL FLOW

INTERCHANGEABLE LENS UNIT FOR USE IN CAMERA SYSTEM

This is a continuation application under 37 CFR 1.62 of prior application Ser. No. 556,957, filed Jul. 23, 1990, now abandoned, which is a continuation of application Ser. No. 399,175 filed Aug. 28, 1989, now abandoned.

BACKGROUND OF THE INVENTION

1. Field of the Invention

The present invention relates to interchangeable lens units for use in camera systems such as video cameras, still cameras and the like.

2. Description of the Related Art

FIG. 1 shows a generally known type of interchangeable lens unit for use in a video camera system.

The illustrated lens unit is provided with a photographic optical system constructed of a focusing lens group (hereinafter referred to simply as focusing lens) L1, a zoom lens group (hereinafter referred to simply as zoom lens) L2, and a relay lens group (not shown).

A distance ring 101 having a cam portion around its outer periphery is fixed by a mounting screw 102 to a front tube 106 which retains the focusing lens L1. The front tube 106 is coupled to the outer periphery of a fixed tube 103 by helicoid thread means. A motor 105 is fixed to a structure member 104 mounted on the fixed tube 103. When the output gear 105a of the motor 105 is meshed with an external gear 101a of the distance ring 101, the front tube 106 is caused to rotate integrally with the distance ring 101 and is guided by the helicoid thread means to cause the focusing lens L1 to travel forward or backward along the optical axis thereof.

FIG. 2(a) is an enlarged view showing the enmeshment between the output gear 105a of the aforesaid motor 105 and the external gear 101a of the distance ring 101. It is assumed here that the output gear 105a in the state shown in FIG. 2(b) rotates in the counterclockwise direction as viewed in the figure so that the counterclockwise force is transmitted to the external gear 101a on the driven side as a clockwise force. In this state, if the output gear 105a is reversed in response to a certain command, the external gear 101a follows the output gear 105a but, as shown in FIG. 2(c), the motion of the external gear 101a is delayed by a time interval corresponding to a backlash "d" between these gears and a time period which elapses during the halt of the output gear 105a. As this response delay becomes larger, a lag increases between the transmission of a command from a camera body and the operation of an element to be controlled in a lens unit, with the result that various problems will be encountered. For example, during the interval of a backlash, although the driving system is activated in accordance with control information, the driven portion may not be driven. This phenomenon would cause malfunction.

Such a backlash or the like appearing in the above-described driving mechanism occurs in any mechanism portion such as an automatic diaphragm control device, a power zooming mechanism driven by a motor and the like in the lens unit.

The problem of backlashes is further explained with illustrative reference to an automatic focus adjustment operation (AF operation). During the interval of a backlash, even if a lens drive command is sent from the camera body, the lens unit is not driven. Accordingly, even if the lens unit is driven, no variation occurs in a focus signal in an AF circuit provided in the camera body. This state resembles a state which appears when an in-focus point is reached in a peak detection control method which commonly includes the steps of extracting the component in a video signal, corresponding to the degree of focusing, and driving the lens unit so as to maximize the component. Accordingly, it is likely that the AF circuit of the camera body erroneously regards the above state as an in-focus state to stop the operation of the lens unit. When the direction of driving is reversed, a so-called dead band occurs due to a backlash. As a result, each time the direction in which the lens unit is driven is changed, the operation of the lens unit will come to a halt.

SUMMARY OF THE INVENTION

It is, therefore, a first object of the present invention to provide an interchangeable lens unit in which, even if, in the lens unit, a delay or an error occurs in the power transmission between a driven portion such as an optical system and driving means for driving the same, it is possible to prevent malfunction of the control system of a camera system by transmitting the delay or the error to a camera body as a specific signal.

To achieve the first object, in accordance with one preferred form of the present invention, there is provided a lens unit which includes driving means for driving a driven portion in the lens unit on the basis of control information supplied from a camera body; monitoring means for monitoring the state of transmission of driving power between the driven portion and the driving means; and output means for transmitting a specific signal to the camera body when the monitoring means detects a delay of the transmission of the driving power between the driving means and the driven portion.

It is a second object of the present invention to provide a lens unit for use in an interchangeable lens type camera system in which the lens unit is detachably secured, the aforesaid lens unit being arranged first to detect a response delay between each driving means and a corresponding driven portion in the lens unit and then to independently transmit the response delay relative to each driving means to a camera body, thereby preventing malfunction of the system of the camera body and improving the efficiency of control.

To achieve the second object, in accordance with another preferred form of the present invention, there is provided a lens unit which includes a plurality of driving means for driving a plurality of driven portions in the lens unit on the basis of a signal supplied from a camera body, monitoring means for monitoring the state of each of the driven portions and outputting corresponding monitor information, means for detecting a delay of power transmission between each of the drive portions and a corresponding one of the driving means and then for continuously generating a predetermined control signal for a period within which the delay of power transmission can be absorbed, and communicating means for transmitting the monitor information and the control signal to the camera body in a time-series manner.

It is a third object of the present invention to provide a lens unit which is capable of efficiently transmitting to a camera body information indicative of the presence or absence of a response delay between a driving portion and a driven portion in the lens unit, together with control information for various optical systems in the lens unit.

To achieve the third object, in accordance with another preferred form of the present invention, there is provided an interchangeable lens unit which includes driving means for driving a driven portion in the lens unit on the basis of a signal supplied from a camera body, monitoring means for monitoring the driven state of the driven portion and outputting corresponding monitor information, output means for detecting a delay of power transmission between the driven portion and the driving means and then for continuously generating a predetermined control signal for a period within which the delay of power transmission can be absorbed, and communicating means for transmitting the monitor information and the control signal to the camera body in a time-series manner.

It is a further object of the present invention to provide a camera in which, if a lens unit outputs information indicating that a response delay, an error or the like has occurred in the power transmission between driving means and a driven portion, the control of the lens unit is restricted so as to realize error-free, smooth control.

To achieve the fourth object, in accordance with another preferred form of the present invention, there is provided a camera of the type on which a lens unit is detachably mounted, which camera includes driving means disposed in the lens unit for driving an optical system in the lens unit on the basis of a control signal supplied from a camera unit, output means for outputting a predetermined control signal when an error occurs in the transmission of driving power between the optical system and the driving means, and restricting means responsive to the control information for restricting the operation by the camera unit of controlling the optical system.

It is a fifth object of the present invention to provide an interchangeable lens type camera system which makes it possible to independently prevent malfunction, such as a halt of arithmetic operations or transmission of control information, of each unit of a driving portion by transmitting a time lag, introduced by the absorption of a backlash or the like which may occur when the direction of running of a motor is changed, to a camera body in the form of a signal peculiar to each unit in the driven portion and the driving portion. The camera system according to the fifth embodiment also makes it possible to control the desired unit without stopping or hindering the operations of the other units so that the efficiency of the system can be improved.

Further objects, features and advantages of the present invention will become apparent from the following detailed description of embodiments of the present invention with reference to the accompanying drawings.

BRIEF DESCRIPTION OF THE DRAWINGS

FIGS. 6(a) and 6(b) are views which serve to illustrate the communication timing of the operation of exchanging control information between a lens unit and a camera unit as well as a corresponding data structure;

DETAILED DESCRIPTION OF THE PREFERRED EMBODIMENTS

Preferred embodiments of the present invention will be described in detail below with reference to the accompanying drawings.

Figure 3:
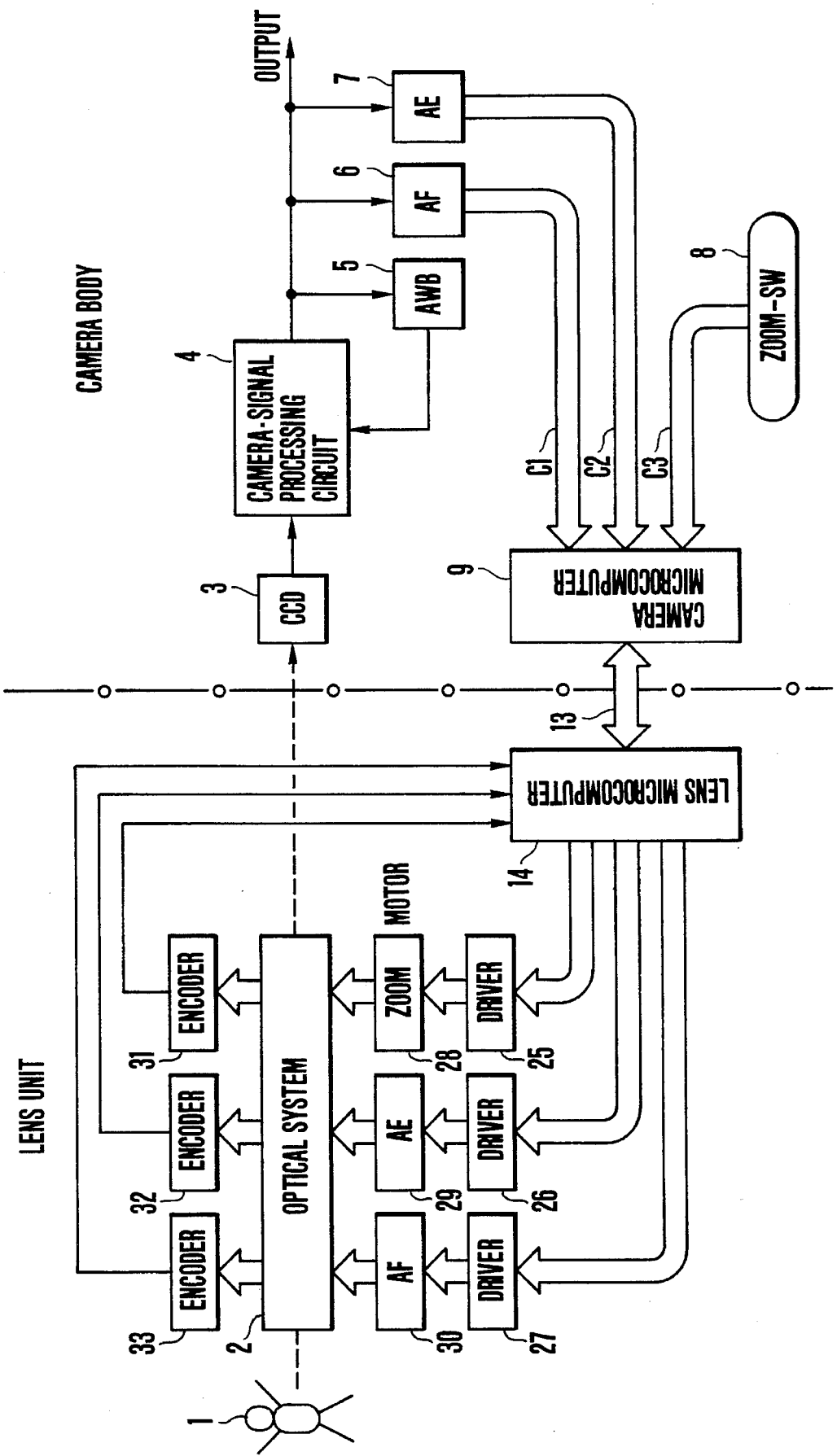
FIG. 3 is a block diagram showing the construction of one embodiment of a camera system according to the present invention.

Referring first to FIG. 3, which is a block diagram showing the construction of a camera system according to the present invention, the outline of the construction of the entire circuit of the embodiment will be explained below. In the figure, the right-hand half and the left-hand half which are separated by one chain line correspond to a camera body and a lens unit, respectively. A light image of a subject 1 is formed on an image sensor 3 such as a CCD by an optical system 2. The output from the image sensor 3 is converted into a television signal by a camera-signal processing circuit 4, and the camera-signal processing circuit 4 outputs the television signal.

The television signal is also utilized by various known automatic adjustment mechanisms such as an AWB (automatic white balance) circuit 5, an AF circuit 6, an AE (automatic exposure control) circuit 7 and the like.

Predetermined control signal are output from these respective control circuits 5, 6 and 7 which serve as sources for generating the control signals to be applied to the aforesaid respective automatic adjustment mechanisms. The control signal generated by the AWB circuit 5 for adjusting the color balance in camera-signal processing is input to the camera-signal processing circuit 4, while the other control signals are input to a microcomputer (hereinafter referred to as "camera microcomputer") 9 incorporated in the camera body.

A control signal generated by a zoom switch 8 used for setting the focal length of the optical system 2 is also input to the camera microcomputer 9.

When the lens unit is mounted on the camera body, a data communication channel 13 is formed through an electrical contact (not shown) between the camera microcomputer 9 and a microcomputer (hereinafter referred to as "lens microcomputer") 14 incorporated in the lens unit. All the data transferred from the camera microcomputer 9 through the data communication channel 13 are received by the lens microcomputer 14.

Various control signals, $C_1$, $C_2$ and $C_3$ input into the camera microcomputer 9 are converted into predetermined forms of data in accordance with a program stored in a ROM incorporated in the camera microcomputer 9, and the thus-converted forms of data are translated into a predetermined communication format. Subsequently, information concerning the lens unit is supplied to the lens microcomputer 14 over the data communication channel 13.

Figure 1:
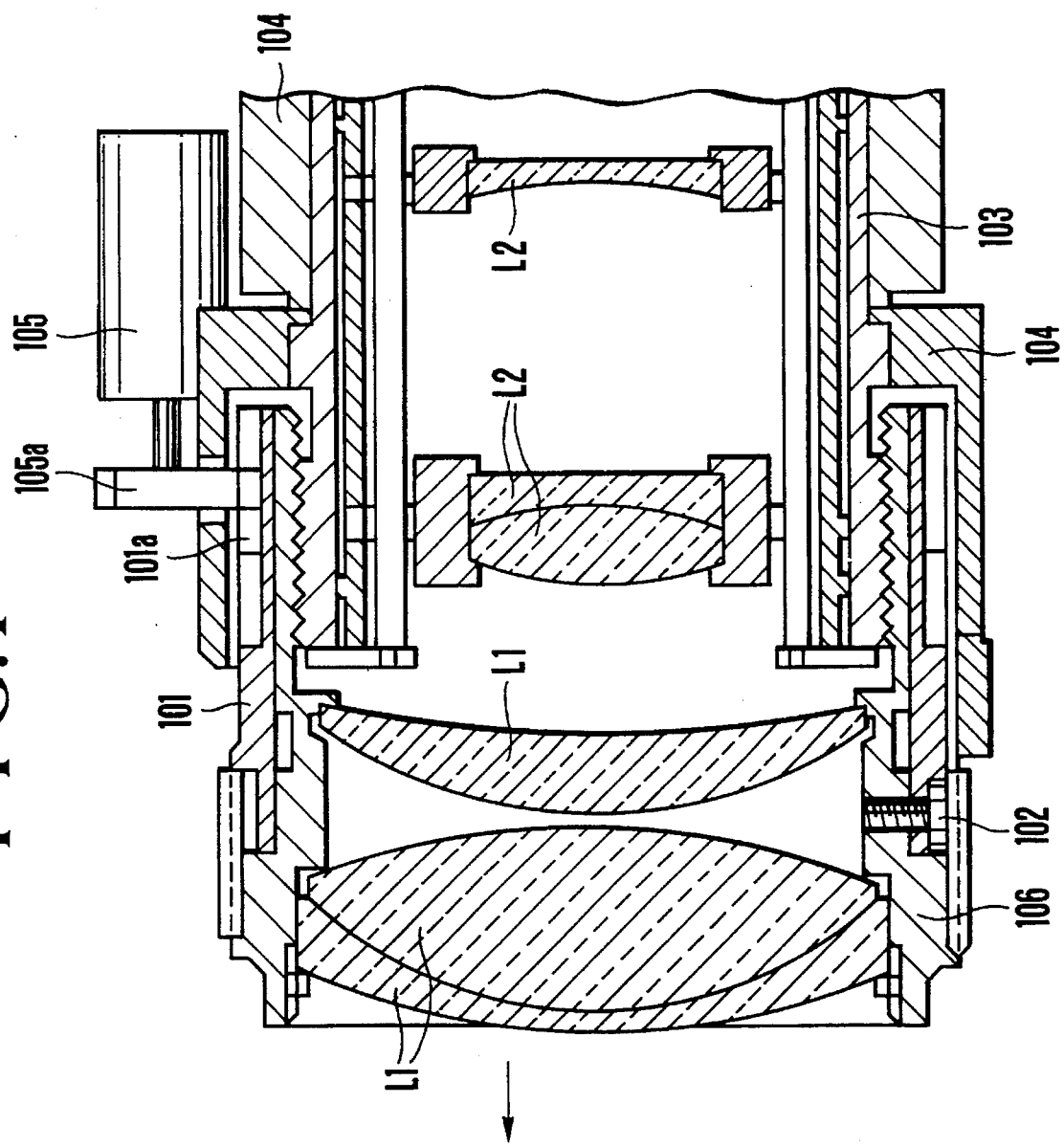
FIG. 1 is a diagrammatic cross-sectional view showing the construction of a general interchangeable lens unit.

A zooming motor, denoted by 28, serves as a power source for controlling and causing a zoom lens to travel along the optical axis, the zoom lens being associated with zooming operation in the optical system 2. This zooming motor 28 is driven by a driver 25 which is activated by the lens microcomputer 14 in response to the operation signal $C_3$ supplied from the zoom switch 8 to the lens microcomputer 14 through the camera microcomputer 9. An AE motor, denoted by 29, serves as a power source for controlling the opening and closing of a diaphragm provided in the optical system 2. Driving of this AE motor 29 is performed in the following manner: first, the camera microcomputer 9 performs arithmetic operations on a proper aperture value in response to the control signal $C_2$ supplied from the AE circuit 7; then, the camera microcomputer 9 gives a drive command to the lens microcomputer 14; and finally, the lens microcomputer 14 activates the driver 26 on the basis of the drive command. An AF motor, denoted by 30, serves as a power source (for example, the motor 105 shown in FIG. 1) for controlling and causing a lens (for example, the focusing lens L1 shown in FIG. 1) to travel along the optical axis, the lens being associated with focusing operation in the optical system 2. Driving of the AF motor 30 is performed in the following manner: first, the camera microcomputer 9 performs arithmetic operations on the direction of focusing and the amount of defocusing in response to the control signal $C_1$ supplied from the AF circuit 6; then, the camera microcomputer 9 gives a drive command to the lens microcomputer 14; and finally, the lens microcomputer 14 activates a driver 27 on the basis of the drive command.

A zooming encoder, denoted by 31, monitors through a code board or a pulse board the movement of the lens associated with zooming operation and supplies the monitor information to the lens microcomputer 14. A diaphragm encoder, denoted by 32, monitors the motion of a moving member of the diaphragm and supplies the monitor information to the lens microcomputer 14. An AF encoder, denoted by 33, monitors the motion of a lens associated with a focusing operation (the focusing lens L1) by means of a pulse reading means (for example, a fringe pattern consisting of the repetition of reflection and non-reflection portions is formed around the outer periphery of the distance ring 101 shown in FIG. 1, and an optical type of sensor consisting of light casting and receiving elements is disposed on the inner periphery of the structure member 104 which opposes the outer periphery of the distance ring 101). The encoder 33 is arranged to be capable of discriminating between the movements of the focusing-associated lens in opposite directions, that is, between the movement of the lens towards the close-focus end and the movement of the same towards infinity. Of course, the signal supplied from the encoder 33 to the lens microcomputer 14 includes information concerning the direction of movement of the aforesaid lens associated with focusing.

The lens microcomputer 14 is arranged to provide control over the direction of running, the start/stop, and the speed of each of the motors 28, 29 and 30. The lens microcomputer 14 is also arranged to transmit data to the camera microcomputer 9 in the form of time-shared serial data. The data communication will be described later in detail.

Figure 4:
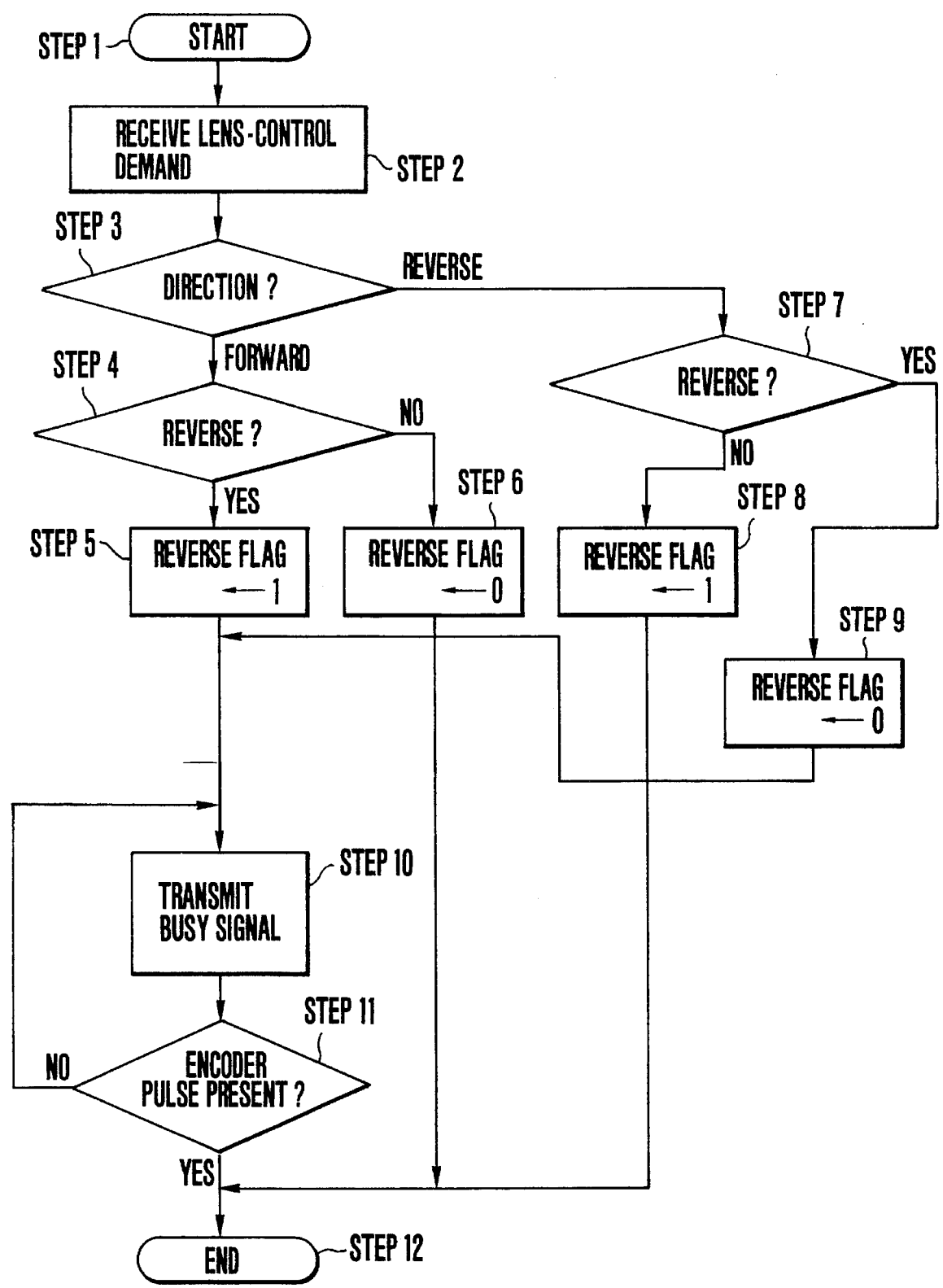
FIG. 4 is a flow chart showing a control operation which is characteristic of the camera system of FIG. 3.

Then, referring to the flow chart of FIG. 4, the operation of the lens microcomputer 14 which is a primary element of the embodiment is explained.

In Step 1, this flow is started when control over the running of the motor 28, 29 or 30 is the lens unit is started by the command of the camera microcomputer 9.

In Step 2, the lens microcomputer 14 receives a control command from the camera microcomputer 9 and decodes this command.

In Step 3, the flow selects either of two different paths in accordance with whether the preceding direction of running of the motor 28, 29 or 30 in the lens unit is forward (+ end point) or reverse (− end point). If the running direction is forward, the flow proceeds to Step 4, while if it is reverse, the flow proceeds to Step 7.

Figure 2A:
FIGS. 2(a), 2(b) and 2(c) are enlarged schematic views of an essential portion of FIG. 1, and serve to illustrate the operation thereof.
Figure 2B:
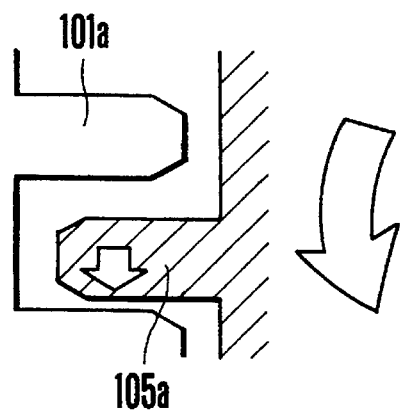
Figure 2C:
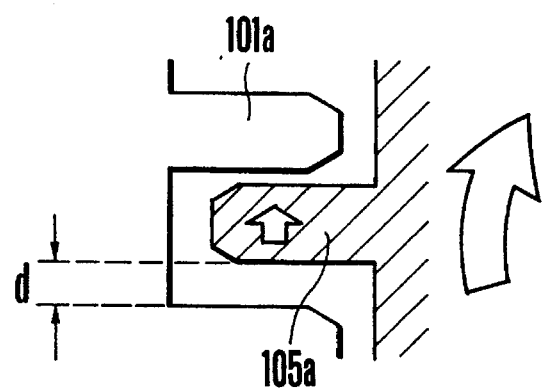

In this step 7, at the instant when the camera microcomputer 9 issues a command concerning the succeeding running of the motor 28, 29 or 30 in the lens unit, a decision is made as to the direction in which a driven gear in a power transmission system connected to the relevant motor is engaged with a driving gear. More specifically, the subsequent flow selects either of two different paths in accordance with whether the engagement between them is in the state shown in FIG. 2(b) or the state shown in FIG. 2(c).

In Step 4, the direction of the preceding running of the relevant motor in the lens unit is determined on the basis of a REVERSE flag indicative of the direction of running.

If the direction of driving of the motor 28, 29 or 30 in the lens unit is forward immediately before the present command is issued, the REVERSE flag is set to "0"; otherwise it is set to "1". Accordingly, in this step 4 and in a case where the REVERSE flag is "0", if the present command of the camera microcomputer 9 indicates switching from the preceding direction to the direction reverse thereto (the preceding direction of driving of the motor is reverse to the direction indicated by the command which has presently received), the process proceeds to Step 5. Conversely, if the direction of the preceding driving of the motor is forward, i.e., the same as the direction of driving indicated by the present command, the process proceeds to Step 6.

In Step 5, the REVERSE flag is set to "1", and the flow proceeds to Step 10.

In Step 6, the REVERSE flag remains "0", and the flow proceeds to Step 12 (END).

In Step 7, if the REVERSE flag is "1", if the relevant motor is running in the reverse direction, and if the command of the camera microcomputer 9 indicates the reverse direction which is the same as the direction indicated by the previous command, the flow proceeds to Step 8. Conversely, if the direction of the preceding driving of the motor is reverse but the direction indicated by the present command is forward, the flow proceeds to Step 9.

In Step 8, the REVERSE flag is remains "1" and the flow proceed to Step 12 (END).

In Step 9, the REVERSE flag is set to "0" and the flow proceeds to Step 10.

In Step 10, the lens microcomputer 14 transmits a busy signal to the camera microcomputer 9, and this busy signal serves to inform the camera body of a control-dead state wherein a driven-side transmission system has not yet been driven due to the backlash or the like of a gear although the motor 28, 29 or 30 in the lens unit is driven in the direction reverse to the direction of the preceding running. When this busy signal is received in the camera body, the camera microcomputer 9 takes measures such as the interruption of another routine and a temporary stoppage of the communication with the lens microcomputer 14.

In Step 11, the encoder 31, 32 or 33 detects whether or not the driven-side transmission system starts to operate in the direction which corresponds to the direction of the driving of the motor 28, 29 or 30, that is to say, whether or not a detection pulse which represents that the backlash has been absorbed has been output. If the detection pulse is not detected, it is determined that the backlash has not yet been absorbed, and the process returns to Step 10, here the generation of the busy signal is continued. On the other hand, if the detection pulse appears, it is determined that the backlash has been absorbed and the process proceeds to Step 12, where this flow ends. Then, the process proceeds to the next normal control operation.

In the first embodiment utilizing the flow chart of FIG. 4, the absorption of the backlash is confirmed on the basis of the pulse output from the encoder 31, 32 or 33. However, since the period required to absorb backlash can be inferred approximately accurately, it is also possible to control the generation of the busy signal on the basis of a set time period alone. The operation of this method is explained with reference to the flow chart shown in FIG. 5 as a second embodiment.

Steps 1 to 9 in this flow chart are the same as those shown in FIG. 4, and the description thereof is therefore omitted.

In Steps 1 through 9, if the direction of running of the relevant motor is reversed and if the backlash needs to be absorbed, the flow proceeds to Step 20.

In this Step 20, timer means is started at the instant when the motor 28, 29 or 30 in the lens unit is driven in the direction reverse to the preceding direction. This timer means is set to a time interval which is slightly longer than a time lag resulting from the backlash since the amount of backlash is previously known.

In Step 21, the lens microcomputer 14 transmits the busy signal to the camera microcomputer 9.

In Step 22, when the timer means measures the set time interval, the flow proceeds to Step 12, where this flow ends. If the timer means has not yet measured the set time interval, the flow returns to Step 21, where the outputting of the busy signal is continued.

In the above embodiment, an advantage of the operation shown in the flow chart of FIG. 4 is not merely to transmit the busy signal in order to inform the camera microcomputer 9 of the time period required to absorb the backlash. In addition, for example, at the instant when the motor in motion is rapidly stopped and reversed, it is possible to transmit the busy signal corresponding to the time period which elapses during the halt of the motor is contained in a time lag derived from the command of the camera microcomputer 9. Moreover, the operation shown in the flow chart of FIG. 4 is capable of accommodating a variation in time lag due to the rotational speed of the relevant motor.

Figure 5:
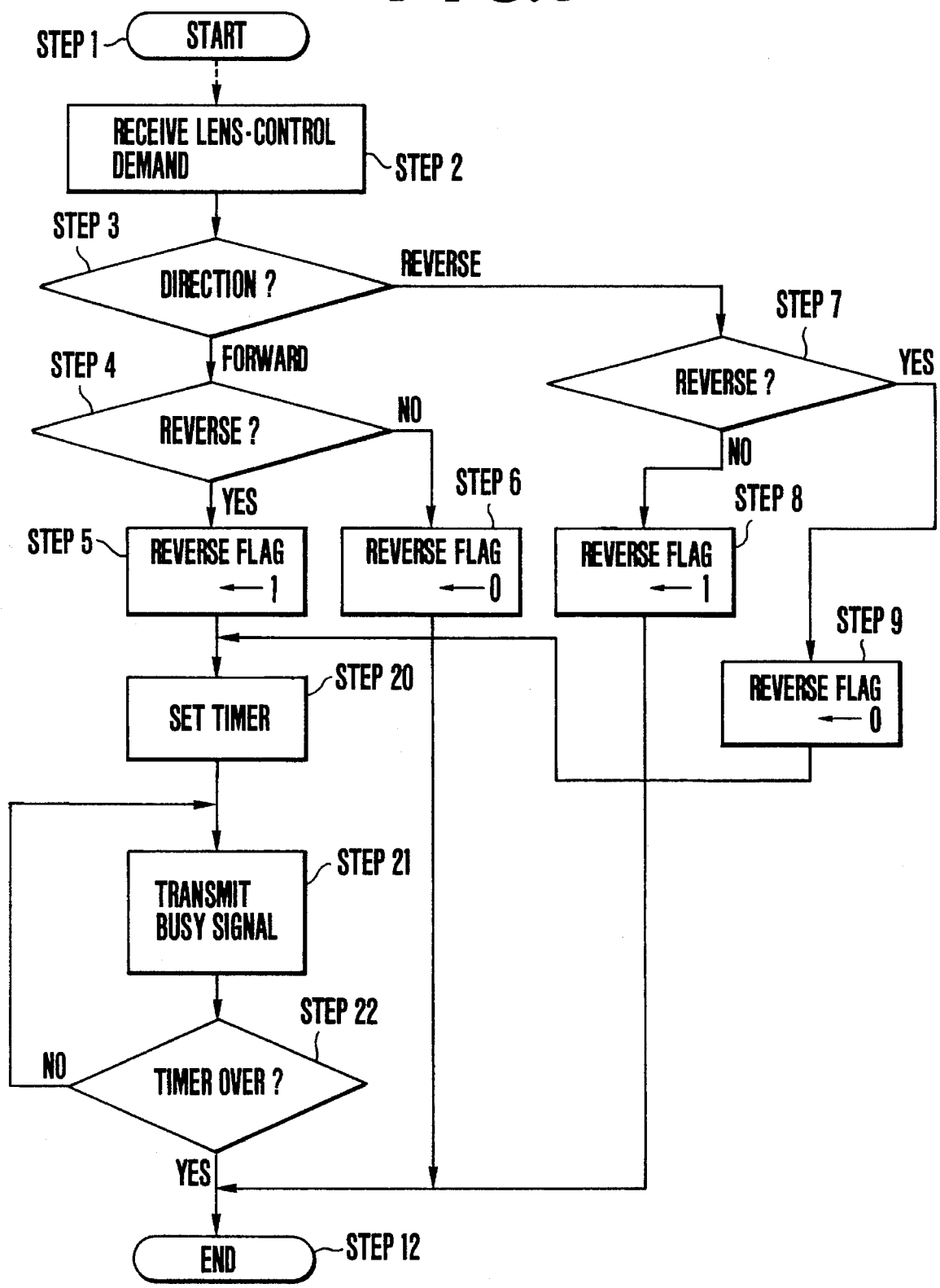
FIG. 5 is a flow chart showing a control operation in a second embodiment.

Incidentally, if the time interval is varied on the basis of information concerning the halt of the relevant motor and information on the speed of running of the motor and this varied time interval is set in the timer means in Step 20 of the flow chart of FIG. 5, it is possible to yield an advantage similar to that achieved by the flow chart of FIG. 4 even in the flow chart of FIG. 5.

In the embodiment described above, a time lag, introduced by the absorption of backlash or the like which may occur when the direction of running of the motor is changed, can be transmitted to the camera body as a specific signal. Accordingly, it is possible to eliminate various problems connected with the timing of control of the system.

In the lens unit which has been proposed in accordance with the above-described embodiment, while a backlash is being eliminated on the lens side, a busy signal is output to the camera body and, while the busy signal is being output, arithmetic operations on control information in the camera body or transmission of control information from the camera body to the lens side are temporarily stopped and deferred, to thereby prevent malfunction during the elimination of the backlash. In the aforesaid lens unit, however, since the transmission of the control information is stopped or deferred until no busy signal is transmitted from the lens unit, some problems may be experienced in terms of the control timing of the system. For example, not only an AF unit but other units such as a zooming unit or an automatic aperture control unit operable in correspondence with a variation in an image signal may temporarily stop operating, or transmission of the control information may be deferred.

A third embodiment which will be described below is aimed at improving the above embodiments in terms of the above-described points. In accordance with the third embodiment, there is provided a lens unit of the type which is detachably secured to a camera body, which unit comprises a plurality of driving means for driving a plurality of driven portions incorporated in the aforesaid lens unit on the basis of a signal supplied from the camera body, monitoring means for monitoring the state of each of the driven elements and outputting corresponding monitor information, means for detecting a drive delay occurring between each of the driven portions and a corresponding one of the driving means and then for continuously generating a predetermined control signal for a period within which the drive delay can be absorbed, and communicating means for supplying each of the monitor information and each of the control signals to the camera body in a time-shared manner. With the third embodiment, it is possible to detect any lag of response between each driven portion and a corresponding one of the driving means in the lens unit and, for each of the driven units, it is also possible to prevent the malfunction of a control system due to the offset between control information and an actual operation without effecting the other driving systems.

The third embodiment of a lens unit according to the present invention will described in detail with reference to FIGS. 6(*a*) through 9. The overall construction of the circuit of the third embodiment is similar to that of the circuit of the first embodiment shown in FIG. 3 and the description thereof is therefore omitted. The third and first embodiments differ from each other in a control algorithm executed by a microcomputer.

FIG. 6(*a*) shows communication data appearing between the camera microcomputer 9 and the lens microcomputer 14 in a camera system realized in accordance with the present invention. Control information (hereinafter referred to as "CTL") transmitted from the camera microcomputer 9 to the lens microcomputer 14 has a structure in which control instructions corresponding to AF, AE and zooming circuits are serially stored in that order in the form of one packet. Such control information CTL is transmitted to the lens microcomputer 14 in synchronization with the vertical synchronizing signal (V period) of a television signal in the camera body.

The data communication channel 13 consists of a bidirectional bus. When the lens microcomputer 14 receives a control signal from the camera microcomputer 9, it immediately transmits monitor information (hereinafter referred to as "LTC") to the camera microcomputer 9, the monitor information LTC consisting of one packet in which monitor information indicating the state of the optical system which has been monitored by each of the AF, AE and zooming encoders 33, 32 and 31 is sequentially stored in a corresponding data area of the control information CTL. The period of transmission of each of the packets of CTL and LTC is substantially synchronized with the V period, but the lens microcomputer 14 receives the control information CTL from the camera microcomputer 9 and reads the result obtained by controlling the optical system on the basis of the control information CTL. Accordingly, the lens microcomputer 14 transmits the monitor information to the camera microcomputer 9 during the next V period. In the figure, each pair of packets which correspond to each other is indicated by an arrow.

In this manner, the encoder information (LTC) or the like corresponding to each of the units is transmitted from the lens microcomputer 14 to the camera microcomputer 9.

The data structures in the respective packets of CTL and LTC are as shown in FIG. 6(b). The structure of CTL is as follows. A header consisting of a predetermined data pattern indicating the start of each of the packets is formed in the leading end portion of CTL, followed by a serial arrangement of AF control information (speed information or the like), AE control information and zoom control information. LTC also has a similar data format in which a header is positioned in the leading end portion of the packet, followed by a serial arrangement of focusing-lens-position monitor information, aperture-value monitor information and a zoom or focal-length information. Particularly, in LTC, information from the encoder of each of the units is provided with a bit (hereinafter referred to as "busy signal") which indicates the drive lag of a corresponding driven system. This busy signal serves as a flag bit in which "1" is set when a drive error occurs due to a backlash or the like between the driving portion and the driven system while each of the driven systems is being driven in accordance with the command contained in control information transmitted from the camera microcomputer 9. This busy signal is transmitted to the lens microcomputer 14 together with LTC.

The operation of the third embodiment will now be explained with reference to the flow chart of FIG. 7.

In this flow chart, a control flow similar to the second embodiment shown in FIG. 5 can be applied to the control operation executed by the lens microcomputer 14 for the purpose of absorbing backlash. Accordingly, this control method is utilized in the third embodiment as well, and the description thereof is omitted.

The operation of the camera microcomputer 9 will first be explained with reference to the flow chart of FIG. 7.

In Step 30, this control flow starts when the camera microcomputer 9 receives from the lens microcomputer 14 the monitor information LTC corresponding to lens information.

In Step 31, the camera microcomputer 9 receives from the lens microcomputer 14 information generated by each of the lens encoders, and decodes the information.

In Step 32, an AF signal indicative of the state of focus in an AF circuit in the camera body is sampled with reference to monitor information concerning the AF driving system. In Step 33, this sampled value is compared with the present value. If any variation is detected in the state of focus, the process proceeds to Step 35 irrespective of the state of the busy signal. In Step 35, control information to be transmitted to the lens unit is updated. In Step 33, if no variation is detected in the state of the AF signal, the process proceeds to Step 34. In Step 34, it is determined whether the focus busy signal in LTC which has been transmitted is "0" or "1". If the focus busy signal is "0", this indicates that the operating cycle of the lens unit is not in the period of a backlash. Accordingly, the process proceeds to Step 35, wherein control information to be transmitted to the lens unit is updated. In Step 34, if the flag of the busy signal is set up, the process jumps over Step 35 to complete the AF control, and then proceeds to AE control executed in Steps 36 to 39. Specifically, in this case, if the contents of control information and a command to be transmitted to the lens unit are the same as the preceding contents and if the lens unit is not driven in accordance with the command owing to the presence of a backlash or the like, it is possible to prevent the drawback that the lens unit is, as described above, stopped at an out-of-focus position due to malfunction of the AF circuit, whereby stable and high-precision control is achieved.

It is to be noted here that even if the busy signal is output during AF control, it is possible to independently control the respective driving units without exerting any influence on the AE system or the zoom controlling system.

Another point to be noted is that if any variation is detected in AF information, data is updated and the control is continued irrespective of the presence or absence of the busy signal to elapse. More specifically, if backlash can be immediately absorbed because of the smallness thereof or if a further variation occurs in the AF signal, the process can proceed to the next control operation without the need to wait for the period of the busy signal. Accordingly, response performance is improved.

The control flow of Steps 36 to 39 shows the control operation of an automatic exposure control device (AE).

In the AE control, in Step 36, an AE signal indicative of the state of exposure in the AE circuit in the camera body is sampled with reference to monitor information concerning the AE driving system. In Step 37, this sampled value is compared with the present value. If any variation is detected in the state of exposure, the process proceeds to Step 39 irrespective of the state of the busy signal. In Step 39, control information to be transmitted to the lens unit is updated. In Step 37, if no variation is detected in the state of the AE signal, the process proceeds to Step 38. In Step 38, it is determined whether an AE busy signal in LTC which has been transmitted is "0" or "1". If the AE busy signal is "0", this indicates that the operating cycle of the lens unit is not in the period of a backlash. Accordingly, the process proceeds to Step 39, where control information to be transmitted to the lens unit is updated. In Step 38, if the flag of the busy signal is set up, the process jumps over Step 39 to complete the AE control, and then proceeds to zoom-lens control executed in the steps subsequent to Step 39.

In the zoom-lens control, in Step 40, zooming is performed by actuating the zoom switch 8. In Step 41, it is determined whether a zoom busy signal in the control information LTC which has been transmitted is "0" or "1". If the zoom busy signal is "0", this indicates that the operating cycle of the lens unit is not in the period of a backlash. Accordingly, the process proceeds to Step 42, where control information to be transmitted to the lens unit is updated. In Step 41, if the flag of the busy signal is set up, the process jumps over Step 42 to complete the zoom-lens control, and then proceeds to Step 43. In Step 43, the control information which has been subjected to processes such as updating, the process of holding the preceding value, and the like in each of the AF unit, the AE unit and the zoom unit is transmitted to the lens unit at the timing explained in connection with FIG. 6(a).

Figure 7:
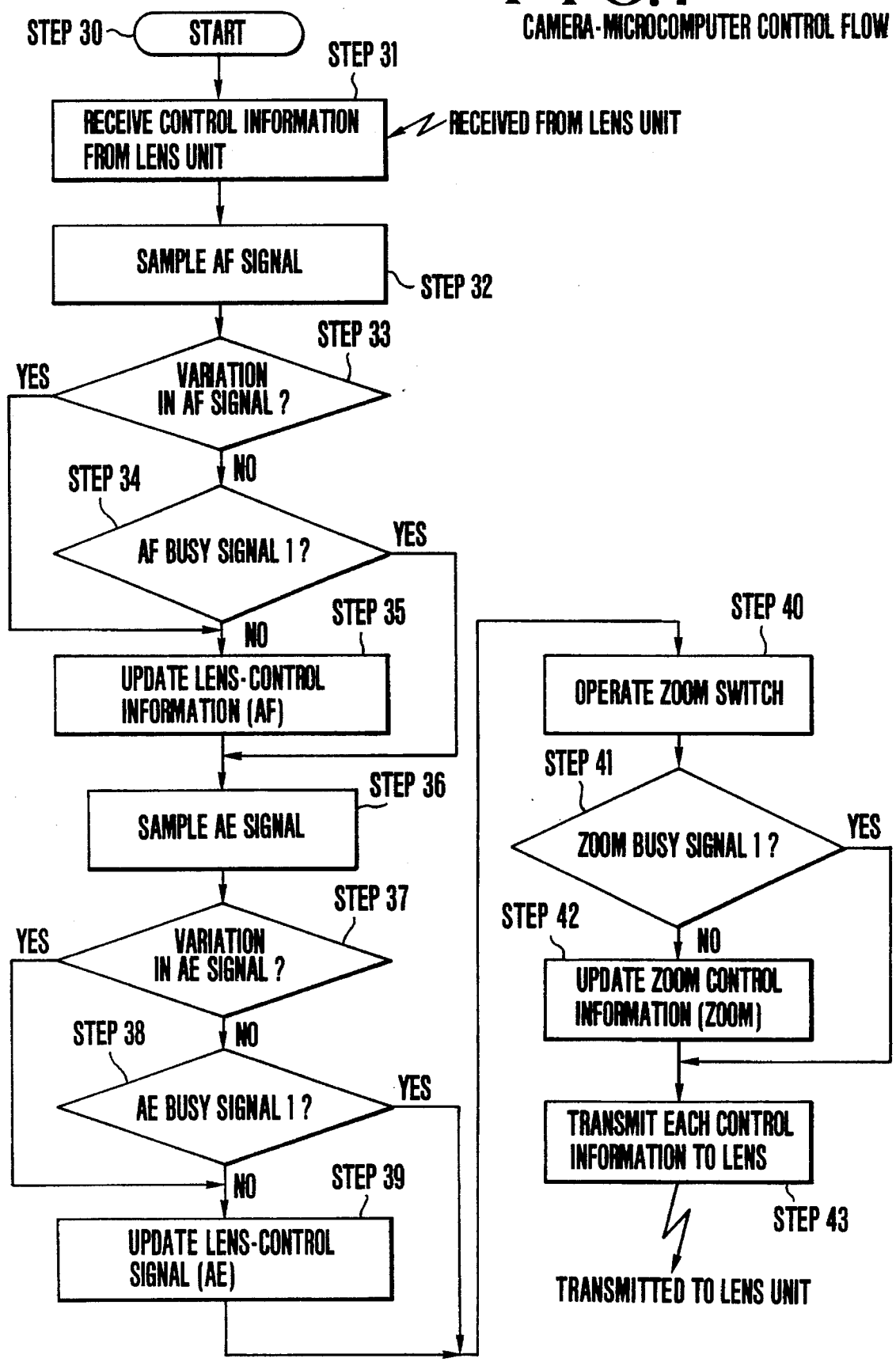
FIG. 7 is a flow chart which serves to illustrate control provided over essential portions by a camera microcomputer in a third embodiment of the present invention.

In the aforesaid embodiment, an advantage of the operation shown in the flow chart of FIG. 7 is, as described above, not merely to inform the camera microcomputer 9 of the time period required to absorb the backlash. In addition, for example, at the instant when the motor in motion is rapidly stopped and reversed, it is possible to transmit an independent busy signal corresponding to each individual unit, in which signal the time period which elapses during the halt of the motor is contained in a time lag derived from the command of the camera microcomputer 9. Moreover, the use of the focus busy signal makes it possible to hold the execution of a drive command supplied to the AF motor alone without holding the execution of the drive command supplied to the AE or the zoom motor. Accordingly, it is possible to eliminate various problems connected with the timing of control of the system.

The above embodiment has been explained with reference to the example in which malfunction of the control circuit in the camera body is prevented while a backlash is being eliminated. However, the offset between control information supplied from the camera body to the lens unit and the behavior of an actual system to be controlled is not caused by a backlash alone and may also be caused by the method of controlling each of the motors.

For instance, a motor for AF control needs to greatly vary its lens-driving speed in accordance with factors such as the distance to an in-focus point, the depth of field and the like. Accordingly, if such a motor is placed under voltage control, the voltage is made to drop during low-speed running and it is therefore impossible to obtain sufficient driving torque. For this reason, it is common practice that if this kind of control is exerted, the motor is placed under duty control (PWM control). With this method, it is possible to obtain sufficient driving torque even during low-speed driving. In duty control, however, since the time period during which the motor is driven is controlled by altering the width of a driving pulse, i.e., the period during which the motor is on, the period during which the motor is off is present during driving thereof. During this period, the lens is not caused to travel although a drive command is issued on the basis of control information transmitted from the camera body. As a result, the presence of such a period as well as the backlash mentioned above forms a cause of malfunction of the automatic focus control device.

Figure 8:
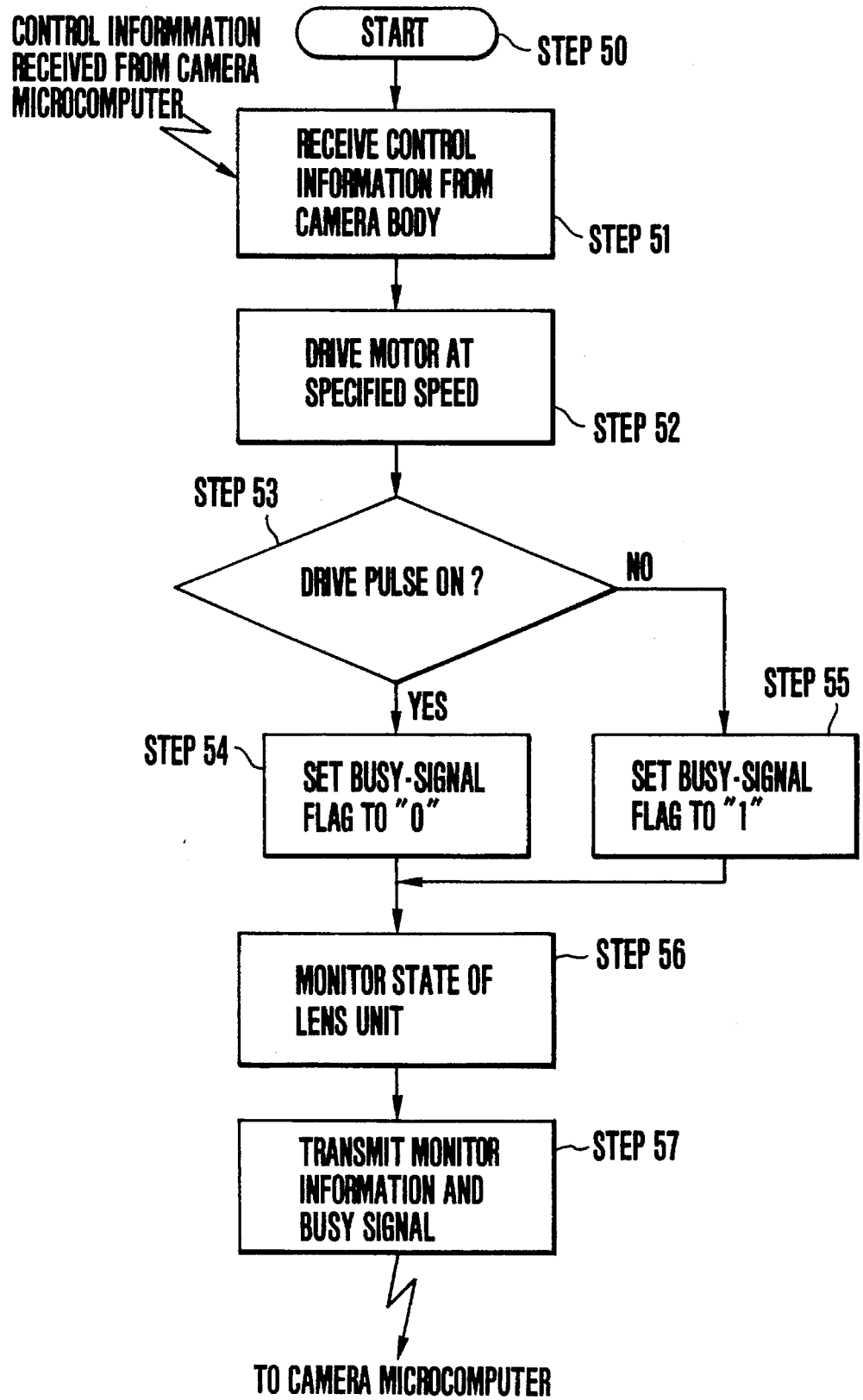
FIG. 8 is a flow chart which serves to illustrate the control operation of a lens microcomputer in a fourth embodiment.

FIG. 8 is a flow chart showing a control algorithm in a fourth embodiment, and the control algorithm is so arranged that a busy signal is output while the duty of a motor drive pulse is off. When control information from the camera body is received, operation of the lens unit is started in Step 50. In Step 51, a lens control command is decoded from the received information, and the process proceeds to Step 52, where the desired motor is driven with a drive pulse of duty corresponding to a specified speed. Then, in Step 53, it is determined whether the drive pulse is on or off. If it is on, the process proceeds to Step 54, where a busy signal flag is set to "0". Then, the process proceeds to Steps 56 and 57, where information, including the busy signal, obtained by monitoring the state of the lens unit is transmitted to the camera body. If it is determined in Step 53 that the duty cycle corresponds to an off period, the process proceeds to Step 55, where the busy signal flag is set to "1". Then, the process proceeds to Step 54, where information obtained by monitoring the state of the lens unit is transmitted to the camera body.

The subsequent control of the camera body is as described previously and the description thereof is therefore omitted.

As is readily understood from the foregoing, in accordance with the present invention, a time lag, introduced by the absorption of a backlash or the like which may occur when the direction of running of the motor is changed, can be transmitted to the camera body in the form of a signal peculiar to each unit in the driven portion and the driving portion. Accordingly, for each unit, it is possible to independently take measures to prevent malfunction, such as stoppage of arithmetic operations on or transmission of control information. Moreover, even while the operation of a particular unit is being controlled, the operation of another unit is not simultaneously stopped or hindered. Accordingly, since problems connected with the timing of control of the system can be eliminated, the present invention is extremely useful in applications to camera systems of interchangeable lens types.

What is claimed is:

1. A lens unit detachably attached to a camera body comprising:

(a) driving means, in said lens unit, controlled and driven on the basis of control information supplied from a control circuit of the camera body;

(b) monitoring means, in said lens unit, for monitoring the driving state and a delay of driving operation of said driving means responsive to the control information and outputting an output signal in response to detecting of the delay of said driving operation; and (c) output means, in said lens unit, for transmitting a specific signal for correcting a control operation of said camera body to said camera body in response to the output signal output from said monitoring means.

2. A lens unit according to claim 1, wherein said driving means drives an optical means to vary an optical state in said lens unit.

3. A lens unit according to claim 2, wherein said driving means drives a focusing lens in said lens unit.

4. A lens unit according to claim 2, wherein said driving means drives a zoom lens.

5. A lens unit according to claim 2, wherein said driving means drives a diaphragm.

6. A lens unit according to claim 2, wherein said driving means is a motor for driving said optical means.

7. A lens unit according to claim 1 or 6, wherein said monitoring means monitors a delay of the transmission of a driving power due to a backlash between said driving means and a driving portion by said driving means.

8. A lens unit according to claim 7, wherein said monitoring means monitors a reversal in the direction of driving by said driving means.

9. A lens unit according to claim 8, wherein said output means outputs a busy signal to said camera body when said monitoring means determines that the direction of driving by said driving means has been reversed.

10. A lens unit according to claim 9, wherein said output means outputs the busy signal over a time period which lasts from discriminating that the direction of driving by said driving means has been reversed on the basis of the output of the monitoring means and the control information until the driving state of said driving means changes.

11. A lens unit according to claim 9, wherein said output means includes a timer arranged to continuously output a busy signal for a predetermined time period when said monitoring means determines that the direction of driving by said driving means has been reversed.

12. A lens unit detachably attached to a camera body comprising:

(a) driving means in said lens unit controlled on the basis of a signal supplied from a control circuit of the camera body;

(b) monitoring means in said lens unit for monitoring the driven state of said driving means and outputting an output signal corresponding to monitor information;

(c) output means in said lens unit for detecting a delay of response of transmission of a driving power of said driving means on the basis of the output signal output from said monitoring means and then for generating a predetermined control signal for correcting a control operation of said camera body for a time period within which said delay of response can be eliminated; and (d) communicating means for transmitting said monitor information and said control signal to said camera body in a time-series manner.

13. A lens unit according to claim 12, wherein said driving means drives an optical movable means arranged to vary an optical state in said lens unit.

14. A lens unit according to claim 13, wherein said driving means having a motor for driving said optical movable means.

15. A lens unit according to claim 14, wherein said monitoring means monitors a delay of the transmission of said driving power due to a backlash between said driving means and said optical movable means.

16. A lens unit according to claim 14, wherein said monitoring means monitors a reversal in the direction of driving by said driving means.

17. A lens unit according to claim 15 or 16, wherein said output means outputs a busy signal over a time period which lasts from the instant when said monitoring means determines that the direction of driving by said driving means has been reversed until the instant when the driven state of said driving means changes.

18. A lens unit according to claim 17, wherein said output means includes a timer arranged to continuously output a busy signal for a predetermined time period when said monitoring means determines that the direction of driving by said driving means has been reversed.

19. A lens unit according to claim 12, wherein said communicating means provides communication between said lens unit and said camera body in synchronization with a vertical synchronizing frequency.

20. A lens unit according to claim 13, wherein said optical movable means includes one of a focusing lens, a zoom lens and a diaphragm.

21. A camera of a type on which a lens unit is detachably mounted, comprising:

(a) first control means for outputting a drive signal for controlling a driving means for driving an optical means in said lens unit; and (b) second control means for restricting the operation of said first control means to drive said optical means, when said second control means is supplied from said lens unit with a control signal which represents that said driving means has been in a specific driving state different from a normal driving state on the basis of said drive signal.

22. A camera according to claim 21, further comprising communicating means for transmitting and receiving said drive signal and said control signal to and from said camera body in synchronization with a vertical synchronizing signal.

23. A camera according to claim 22, wherein said lens unit includes a plurality of optical means, said first control means transmitting drive signals to said respective optical means in a time-series manner.

24. A camera according to claim 23, wherein said control signal which represents that said driving means has reached a specific driving state is independently received in correspondence with each of said plurality of optical means in a time-series manner.

25. A camera according to claim 21, wherein when said second control means receives said control signal, said second control means freezes the state of control provided over said lens unit by said first control means and inhibits updating of the state of control of said driving means in said lens unit.

26. A camera according to claim 21, wherein said specific driving state of said driving means in said lens unit is a state wherein at least one of a delay and an error occurs in a response of transmission of driving power from said driving means to said optical means.

27. A camera according to claim 26, wherein said lens unit includes a plurality of optical means, said control signal being independently output in correspondence with each of said plurality of optical means, said second control means independently restricting said individual optical means.

28. A camera according to claim 27, wherein said optical means includes means for driving a focusing lens, said first control means outputting a drive signal for driving said focusing lens, and said second control means inhibiting updating of the driven state of said focusing lens to hold said focusing lens in the present state thereof.

29. A camera according to claim 21, further comprising means for cancelling said control signal if any variation occurs in the control state of optical means of said lens unit.

30. A camera according to claim 29, wherein said driving means includes a focusing lens, a zoom lens, and diaphragm driving means all of which can be controlled independently of one another.

31. A camera system of the type which includes a lens unit and a camera unit to which said lens unit is detachably secured, comprising:

(a) driving means disposed in said lens unit for driving an optical system in said lens unit on the basis of a drive control signal supplied from said camera unit;

(b) output means in said lens unit for outputting a predetermined signal when an error occurs in said driving means; and (c) restricting means in said camera responsive to said predetermined signal for restricting the operation by said camera unit of controlling said optical system.

32. A camera system according to claim 31, further comprising communicating means for transmitting and receiving said drive control signal and said predetermined signal to and from said camera body in synchronization with a vertical synchronizing signal.

33. A camera system according to claim 32, wherein said lens unit includes a plurality of optical-system-driving means, said driving means transmitting drive control signals to said respective optical-system-driving means in a time-series manner.

34. A camera system according to claim 23, wherein said control signal which represents that said driving means has reached a specific driving state is independently received in correspondence with each of said plurality of optical means in a time-series manner.

35. A camera system according to claim 31, wherein said restricting means receives said predetermined signal, said restricting means freezes the state of control provided over said lens unit by said lens controlling means and inhibits updating of the state control of said driving means in said lens unit.

36. A camera system according to claim 35, wherein the driving state of said driving means in said lens unit is a state wherein at least one of a backlash, a delay, an error and the like occurs in a response of transmission of driving power between said driving means and said optical system.

37. A camera system according to claim 36, wherein said lens unit includes a plurality of driving means, said drive control signal being independently output in correspondence with each of said plurality of driving means, said restricting means independently restricting said individual driving means.

38. A camera system according to claim 37, wherein said driving means includes means for driving a focusing lens, said lens controlling means outputting a drive signal for driving said focusing lens, and said restricting means inhibiting updating of the driven state of said focusing lens to hold said focusing lens in the present state thereof.

39. A camera system according to claim 35, further comprising: means for lasting the operation of said restricting means during a predetermined time being able to absorb the occurring of the error.

40. A camera system according to claim 39, wherein said means for lasting the operation of said restricting mean has a timer.

41. A lens unit of a type which is detachably mounted on a camera body comprising:
  (a) driving means, in said lens unit, controlled on the basis of control information supplied from a microcomputer of the camera body;
  (b) monitoring means in said lens unit for monitoring a controlled state of said driving means; and
  (c) output means in said lens unit for transmitting a specific signal to said camera body on the basis of an output of said monitoring means to correct a control operation for producing said control information in said camera body, in the case that the driving state of said driving means is changed.

42. A lens unit according to claim 41, further comprising:
  communicating means for communicating the control information and the output of said monitoring means between said camera body and said lens unit each other in a predetermined period.

43. A lens unit according to claim 42, wherein said driving means drives a focusing lens in said lens unit.

44. A lens unit according to claim 43, wherein said driving means drives a zoom lens.

45. A lens unit according to claim 44, wherein said driving means drives a diaphragm.

46. A lens unit according to claim 41, wherein said monitoring means detects a driving direction of said drive means.

47. A lens unit according to claim 41, wherein said output means transmits the specific signal to said camera body on the basis of the control information and the output of said monitoring means, in the case that the driving direction of said driving means is reversed.

48. A lens unit according to claim 41 or 47, wherein said specific signal is indicating an occurrence of a backlash in said driving means.

49. A lens unit according to claim 48, further comprising:
  holding means for holding the operation of said output means for transmitting a specific signal to said camera body during a predetermined time being able to absorb the backlash.

50. A lens unit according to claim 49, wherein said lasting means has a timer.

51. A lens unit of a type which is detachably mounted on a camera body comprising:
  (a) driving means, in said lens unit, controlled on the basis of a control information supplied from a control circuit of the camera body;
  (b) monitoring means for monitoring a controlled state of said driving means; and
  (c) detecting means for detecting an occurrence of the transmitting error in said driving means on the basis of the control information and an output of said monitoring means; and
  (d) output means in said lens unit for outputting a predetermined signal corresponding to the occurrence of the transmitting error to said control circuit of said camera body.

52. A lens unit according to claim 51, wherein said detecting means detects an occurrence of a backlash in said driving means.

53. A lens unit according to claim 52, wherein said monitoring means detects a driving direction of said drive means.

54. A lens unit according to claim 53, wherein said output means has a timer means for continuing the operation of transmitting the signal to said camera body during a predetermined time.

55. A lens unit according to claim 54, wherein said predetermined signal is a busy signal to inhibit the operation of said camera body for controlling said driving means.

56. A camera apparatus, comprising:
  (a) driving means for driving an optical means;
  (b) control means for outputting a control information to said driving means to control said optical means;
  (c) monitoring means for monitoring a controlled state of said driving means relative to said control information; and
  (d) output means for transmitting a specific signal to said control means on the basis of an output of said monitoring means, in the case that the driving state of said driving means is changed.

57. A camera apparatus according to claim 56, wherein said optical means driven by said driving means is a focusing lens.

58. A camera apparatus according to claim 56, wherein said optical means driven by said driving means is a zoom lens.

59. A camera apparatus according to claim 56, wherein said optical means driven by said driving means is a diaphragm.

60. A camera apparatus according to claim 56, wherein said monitoring means detects a driving direction of said drive means.

61. A camera apparatus according to claim 56, wherein said output means transmits the specific signal to said control means on the basis of the control information and output of said monitoring means, in the case that the driving direction of said driving means is reversed.

62. A camera apparatus according to claim 56 or 61, wherein said specific signal is indicating an occurrence of a backlash in said driving means.

63. A camera apparatus according to claim 62, wherein said specific signal is a busy signal and the busy signal being lasted to output to said control means during a predetermined time being able to absorb the backlash.

* * * * *